United States Patent

James

[15] 3,675,216

[45] July 4, 1972

[54] NO CLOCK SHIFT REGISTER AND CONTROL TECHNIQUE

[72] Inventor: Randell L. James, Austin, Tex.

[73] Assignee: International Business Machines Corporation, Armonk, N.Y.

[22] Filed: Jan. 8, 1971

[21] Appl. No.: 104,888

[52] U.S. Cl. ....... 340/172.5

[51] Int. Cl. ....... G06f 3/00, G06f 3/10

[58] Field of Search ....... 340/172.5

[56] References Cited

UNITED STATES PATENTS

| | | | |
|---|---|---|---|
| 3,441,910 | 4/1969 | Kahn | 340/172.5 |
| 3,417,377 | 12/1968 | Vietor et al. | 340/172.5 |
| 3,430,211 | 2/1969 | Foure et al. | 340/172.5 |
| 3,441,911 | 4/1969 | Connelly et al. | 340/172.5 |
| 3,543,243 | 11/1970 | Nordquist | 340/172.5 |
| 3,581,284 | 5/1971 | Selden | 340/172.5 |

*Primary Examiner*—Gareth D. Shaw
*Assistant Examiner*—Ronald F. Chapuran
*Attorney*—Hanifin & Jancin and John L. Jackson

[57] ABSTRACT

A shift register and control technique in which no clocking is employed between the control logic, the shift register, and the input to and output from the shift register. Upon start-up of the system a flag code is loaded at random, into a stage of the register and the remaining stages or data positions of the register are loaded with dummy code. Thereafter, the control logic and input to and output from the shift register is timewise controlled by the sensing of the flag which, in the case that the associated input and output means is a typewriter, moves synchronously with the print element or carriage of the typewriter. Four buffers which are connected to the control logic and the data buss for data input to an output from the shift register are connected between the input and output stages of the register and these buffers are logically selectively introduced into the data flow upon the sensing of the flag in the output stage of the register to accomplish timewise shifting of the data in the register for insertion of additional data, deletion of data, and other usual functions such as error correct backspace. Due to the utilization of the sensing of the flag to control the instant that a change in the data path is made no clocking between the input/output and control logic is required and additionally, the length of the shift register can be increased or decreased or the basic timing changed without any change in the control logic.

10 Claims, 10 Drawing Figures

INVENTOR
RANDELL L. JAMES

John L. Jackson
ATTORNEY

NO CLOCK SHIFT REGISTER AND CONTROL TECHNIQUE

BACKGROUND OF INVENTION

1. Field of Invention

This invention relates to shift register control in general and more particularly to a dynamic shift register and control technique which does not employ clocking between the shift register, its control logic and associated equipment, but instead effects timewise control through utilization of a flag code which is detected by the control logic which changes the data paths upon detection of the flag to accomplish the desired data shifting and input and output of the characters.

2. Description of the Prior Art

The shift register art is relatively old and had reached a fairly good state of sophistication in the early stages of computer development. However, classic shift registers normally, due to the fact that flip-flops were employed as the register elements and thus were quite expensive, were limited in their application to such things as timing control, short delay lines, etc. Due to their cost there was no wide spread use of shift registers as large scale manipulative buffers to hold relatively large amounts of information such as a page of printed material for editing and revision purposes. With the advent however, of relatively inexpensive monolithic circuitry, shift registers can now be utilized for instance, in one page buffer applications.

Some of the problems associated with the use of shift registers as one page buffers are due to the rigidity or inflexibility of the usual control techniques which utilize a single clock for control of the system. That is, the shift of the register and the application of control signals from the logical control unit and input and output to the associated apparatus is under control of a single clock and it is extremely difficult to change the data rate of the register if it is to be associated with another apparatus requiring different data rates. Additionally, such a control technique is quite inflexible as far as expanding or decreasing the amount of storage or length of the register in that the control logic depends upon a relatively fixed length register. Because of the two above mentioned problems it has been impossible to construct a shift register which could be used in a modular line of products, since as the amount of data to be stored changes and/or different I/O devices are added different shift registers were required.

These problems are overcome by the present invention by providing a register system which is relatively universal as far as the types of input and output devices that it can work with as far as time is concerned. Additionally, the register can be expanded or decreased in capacity without requiring changes in the control logic or associated logical techniques. Thus, the basic shift register can be employed in a modular line of products ranging from a typewriter with a single page buffer to a system including a multi-page buffer, bulk cassette storage and a display tube without any change to the basic logic or timing of the shift register.

BRIEF SUMMARY OF INVENTION

Briefly, there is provided a shift register and control technique in which no clocking is employed between the control logic, the shift register, and the input to and output from the shift register. Upon startup of the system, assuming a shift register of $m$ characters in length a flag code is loaded at random into the register and the remaining data positions of the register $m-1$ are loaded with dummy codes. Thereafter, the control logic and input to and output from the shift register is timewise controlled by the sensing of the flag which, in the case that the associated input and output means is a typewriter, moves synchronously with the print element or carriage of the typewriter. Four buffers which are connected to the control logic and the data buss for input to and output from the register are connected between its input and output stages and these buffers are logically connected into the data flow upon the sensing of a flag bit to accomplish timewise shifting of the bits in the register for insertion of additional material or deletion of material and other usual functions such as error correct backspace. While the sensing of the flag at the output of the shift register controls the timing of the system, it in conjunction with the sensing of the dummy codes inserted are used to provide a simplified logical control. That is, the sensing of the flag at the output of the shift register causes the desired sequence to be entered into and this sequence continues until terminated by the sensing of a dummy code at the output of the shift register.

Due to the utilization of the flag to control the instant that a change in the data path is made no clocking between the input/output and control logic is required and additionally, the length of the shift register can be increased or decreased or the timing changed without any change in the control logic. Thus, in the preferred embodiment the only clock employed is the internal register clock which has data rate such that the register will make at least one loop between data input or output. That is the register clock has a cycle rate which will allow one full memory cycle during the time required for the utilizing device to be serviced. This clock rate will prevent the memory from being the limiting factor in data throughput.

DETAILED DESCRIPTION OF THE DRAWINGS

Figure 1:
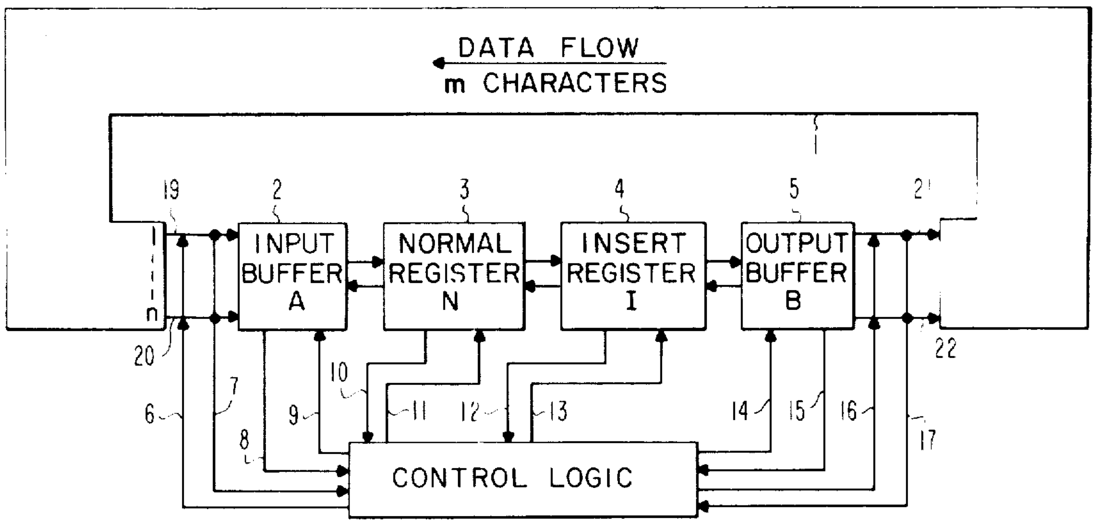
FIG. 1 is a generalized block diagram showing a shift register with certain buffers connected between its input and output stages which are controlled by a control unit to accomplish alteration of the data paths for timewise shifting of the data for insertion or deletion of characters.

For a more detailed description of the present invention refer first to FIG. 1 wherein is shown a generalized block diagram of a system employing four registers between the input and output stages of a shift register in accordance with the present invention. As shown the shift register 1 is of $m$ characters in length and each character may be $n$ bits in length. The data as depicted moves in a counter clockwise direction. The data comes out of the final stage on lines 19 and 20 and is applied to an input buffer 2. This buffer, during the subsequent description of data flow, to simplify the description, is labeled A. Buffers and registers subsequently to be described are also designated with briefing characters N, I, and B. The output from the shift register is also applied along line 7 to a control logic unit and as shown the control logic unit can also apply data along line 6 to lines 19 and 20. In the subsequent description while lines such as 6 and 7 are shown as single lines it should be understood that there are as many lines actually as each character is wide. Input buffer 2 is also connected to normal register 3 and as shown can both provide data to normal register 3 and accept data from register 3 which is designated the N buffer. The input buffer 2 is also in two-way communication with the control logic along lines 8 and 9 and as shown normal register 3 is likewise in two-way communication with the control logic along lines 10 and 11. Further, as shown the normal register is in two-way communication with insert register 4 which likewise is in two-way communication along lines 12 and 13 with the control logic. Finally, insert register 4 is in two-way communication with output buffer 5 which also is in two-way communication along lines 14 and 15 with the control logic. Again as shown the control logic is in two-way communication with lines 21 and 22 along lines 16 and 17 which connect the input stage of the buffer to the control logic.

With this generalized block diagram data flow is under the control of the control logic and the control logic as illustrated takes the data from the output stage of the register and channels it into the appropriate register A, N, I or B to control timewise shifting or the control logic applies data to the input stage of the register along lines 21 and 22 or takes data from the output of any register or causes data to be applied to any register to accomplish any of the required functions associated with the task to be performed. The generalized flow of FIG. 1 is shown merely to illustrate that the control logic accepts data from the various lines and buffers and channels the data to the appropriate registers to cause insertion, deletion, etc., of characters.

Figure 2:
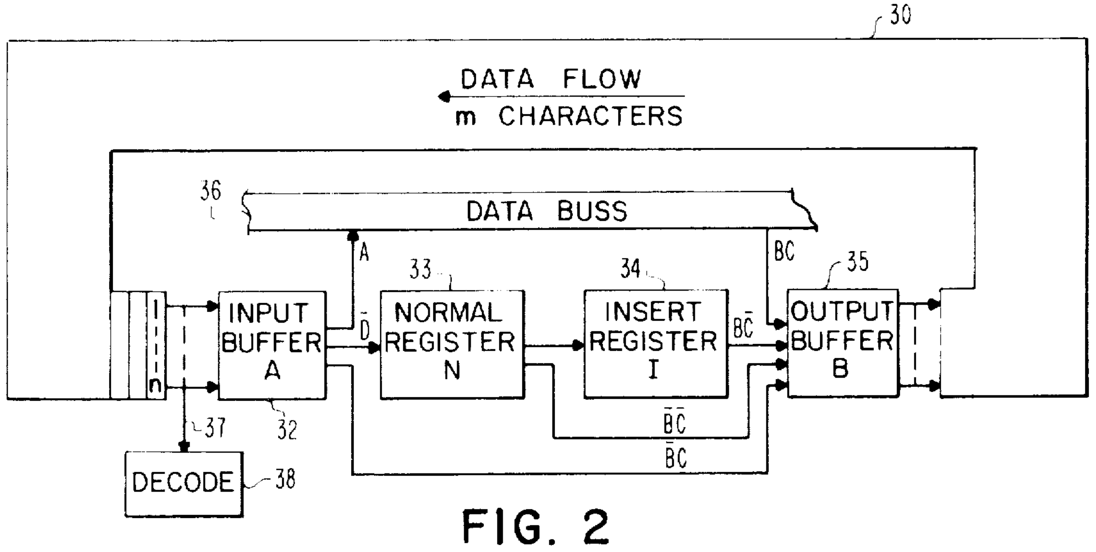
FIG. 2 is another block diagram illustrating a preferred embodiment of the subject novel shift register and control technique.

In FIG. 2 is shown a preferred embodiment of a system generally in accordance with the generalized diagram of FIG. 1 but which is much more efficient than the system of FIG. 1 in that the system of FIG. 2 does not directly control the data flow by bringing the characters into the control logic but instead by selective actuation of four logical lines can cause the completion of editoral tasks such as insertion of characters, deletion of characters, error correct backspace and other functions normally found in revision systems.

As shown in FIG. 2, a shift register 30 has a data flow in the counter clockwise direction such that the output of the register is applied to an input buffer 32 again labeled A. The output from the register is also applied along line 37 to a decode unit 38 which decodes the characters and provides an indication to the control logic, not shown, as to which characters are at the output of the register. As will later be discussed in more detail, the control codes which facilitate the highly simplified logical control hereinafter described include dummy codes delete characters, and a flag. The output from the input buffer A can be applied under logical control to line $\bar{B}$ C which causes the data to flow from input buffer A to an output buffer 35. Additionally, data from the input buffer 32 may be applied along line $\bar{D}$ to normal register 33.

Input buffer 32 is also, as shown, connected along line A to a data buss 36. Data buss 36 in turn is connected along line BC to the output buffer 35. The data buss is shown in general form and its specific configuration will depend upon the type of apparatus connected to the shift register. That is, the data buss may in effect be the character output register and the input register of a typewriter. The normal register 33 is as shown connected along line $\overline{BC}$ to the output buffer 35 and is also connected to the insert register 34. The insert register 34 is also connected along line B$\bar{C}$ to the output buffer 35. These various lines such as $\overline{BC}$ are labeled in accordance with the logical control signals which must be applied to control the flow of the data along the designated path. These notations are in accordance with those used in the detailed schematic of FIG. 4.

Figure 3:
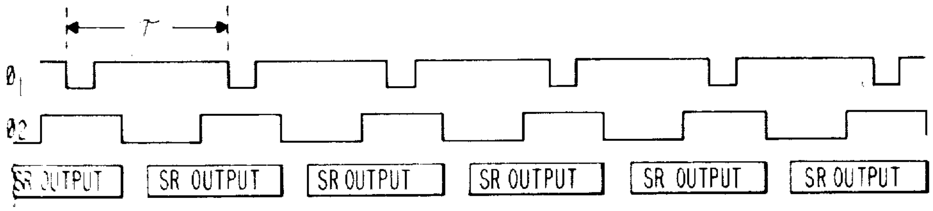
FIG. 3 is a timing diagram illustrating the timing of the two phase clock employed which causes data to shift and be set in the register along with an illustration of the time of valid shift register output.

FIG. 3 shows the basic timing employed in the shift register system. Shown is the output of a two phase clock $\phi_1$ and $\phi_2$; $\tau$ illustrates the cycle time. The falling edge of $\phi_1$ is used to set data into the various buffers while the falling edge of $\phi_2$ defined the output of data from the shift register. As shown the shift register output is not available for a short time following the falling edge of the $\phi_2$ clock.

Figure 4:
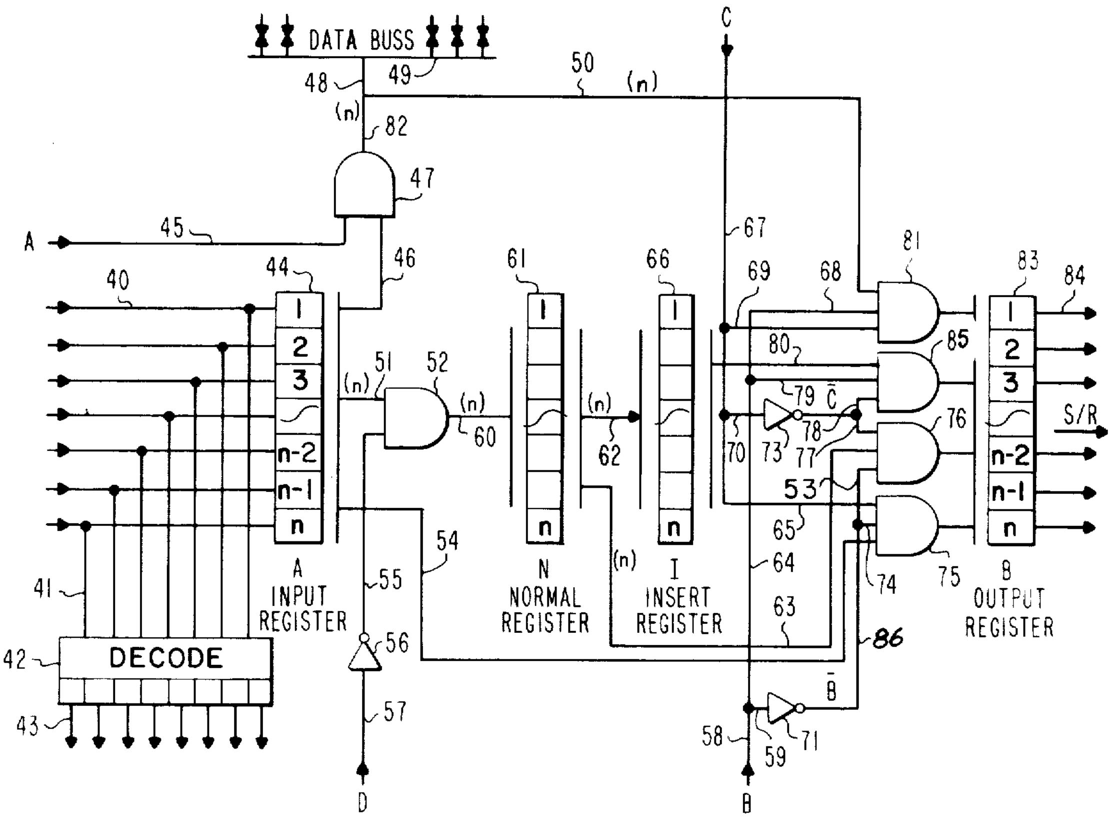
FIG. 4 is a detailed drawing of the preferred embodiment of the shift register of FIG. 2.

For a more detailed description of the subject shift register and control technique, and for an operational description thereof, refer next to FIG. 4. In FIG. 4 are lines 40 which represent the output lines from the output stage of the shift register. Lines 84 are connected to the input stage of the associated shift register. Lines 40 from the output stage of the shift register are applied to the input register 44. The input register 44 is as shown for $n$ stages. The output from the shift register applied to lines 40 is also applied along lines 41 to the decode unit 42 which has its output applied along lines 43 to the control logic. As previously discussed, decode unit 42 decodes the characters appearing on the output line 40 and provides decoded information to the control logic. More specifically, as will later become apparent the characters decoded by decode unit 42 include dummy codes, delete codes, and the flag.

The output from the input register 44 is as shown applied along line 46 to AND gate 47 which in turn receives the A logical input along line 45 from the control unit. Thus, application of a positive logic logical level to line 45 will cause the character appearing on line 40 to pass through AND gate 47 along lines 82 and 48 to the data buss 49. The data appearing on line 40 is also applied along line 51 to AND gate 52 which receives another input along line 57 through inverter 56 along line 55. Thus, application of a positive logical level to line 57 results in AND gate 52 inhibiting passage of data from the input register 44 onto line 60 and into the normal register 61 while application of a negative logical level or $\bar{D}$ to line 57, acting through inverter 56, causes line 55 to apply a positive logical level to AND gate 52 and thus allow the data from input register 44 to pass into normal register 61.

The contents in the input register 44 are also applied along line 54 and to AND gate 75.

The contents of input register 44 which pass through AND gate 52 and along line 60 into the normal register 61 when a low logical level is applied to line 57 are applied along line 62 to the insert register 66. The same data also passes along line 63 to AND gate 76. The data in insert register 66 is also applied along line 80 to AND gate 85.

As shown, a C logical signal is applied along line 67 to lines 69 and 70. Line 69 constitutes another input to AND gate 81 while the signal applied to line 70 through inverter 73 is applied to both AND gates 85 and 76. Further, the B logical signal which is applied to line 58 is also applied along lines 64 and 79 to make up the third input to AND gate 82 and along lines 64 and 68 to make up the third input to AND gate 81. The B logical signal is also applied along line 59, through inverter 71, and along lines 86 and 74 to AND gate 75 and along lines 64 and 53 to AND gate 76. The output of AND gates 75, 76, 81, and 85 are applied to the output register 83 which is connected to the input lines 84 to the associated shift register.

Thus, from the above, it will be seen that application of a positive logical level to the D line 57 will result in the contents of the A input register 44 being inhibited from passing through AND gate 52 while application of low logical level or $\bar{D}$ signal to line 57 will cause the contents of the input register 44 to be passed through AND gate 52 to the normal register 61. Further, the contents of the normal register 61 always are applied to the insert register 66 and are selectively gated into AND gate 85 by application of a positive logical level to line 58 which is the B logical signal along with the application of a low logical level to line 67 which is the C logical signal.

Thus, unless the B signal is true and C signal not true the data in insert register 66 will not pass through AND gate 85 to the output register 83.

In addition, as previously described, when the A logical signal is true the data from the input register 44 is passed through AND gate 47 to the data buss. For input from the data buss AND gate 81 gates data from the data buss 49 along line 50. This will occur as shown when the B and C logical signals are true. Further, data can be gated directly from the normal register 61 along line 63 through AND gate 76 by application of the $\bar{C}$ signal to AND gate 76 in conjunction with the application of a $\overline{B}$ signal to line 58 which, through inverter 71 is inverted to cause the conditions into AND gate 76 to be met to pass the information from the normal register 61 into the output register 83. Finally, data from the input register 44 can be passed directly along line 54 through AND gate 75 by application of a $\overline{B}$ signal to line 58 in conjunction with application of a C logical signal. This will cause the data to pass directly from the input register 44 into the output register 83.

Figure 7:
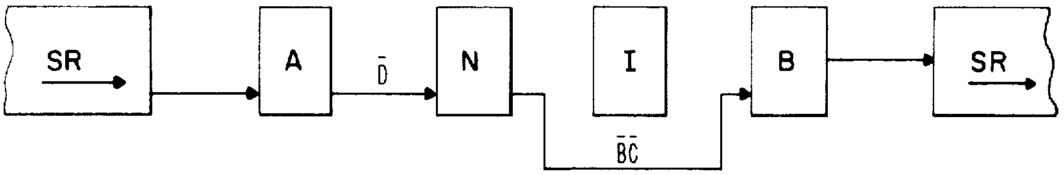
FIG. 7 is a block diagram illustrating the normal data flow between the registers when no change is to be made to the data.

In FIG. 7 is shown in brief form the normal data path that the data takes when there is no data manipulation involved in the flow of data from the output stage to the input stage of the shift register. This same data flow is depicted by the small ($n$) in FIG. 4. As shown the normal data flow is from the output stage of the shift register to the A register, then along the $\overline{D}$ path to the N register, and then, bypassing the insert register, along the $\overline{B}\,\overline{C}$ path to the B register and then into the input stage of the shift register.

Figure 5:
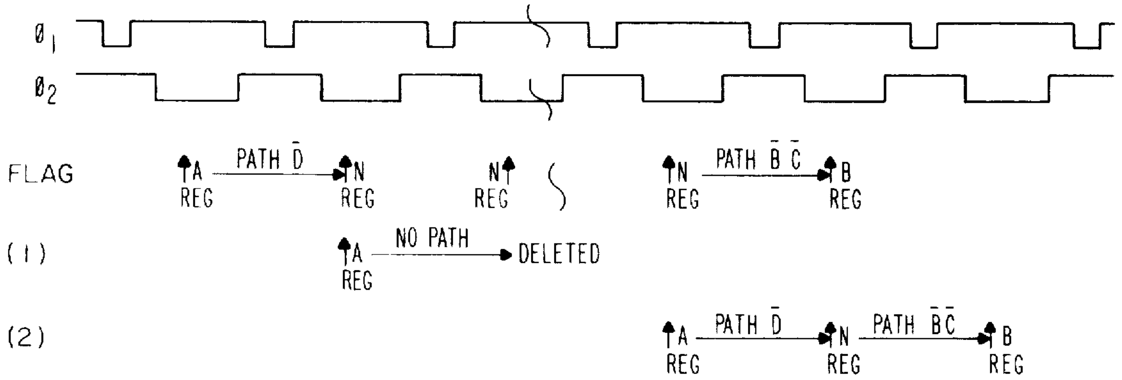
FIG. 5 is a drawing illustrating the timing and data path taken by data in the systems of FIGS. 2 and 4 when a character is to be deleted from the data in the register.
Figure 9:
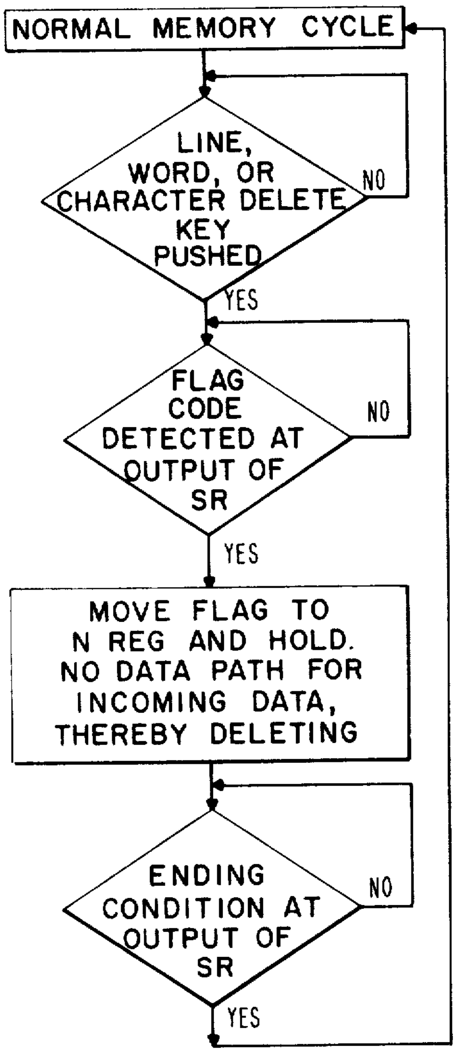
FIG. 9 is a flow chart illustrating the data flow when a character is to be deleted as depicted in FIG. 5.

In FIG. 5 is depicted the delete operation in which a character is to be deleted from the data contained in the shift register. The flow chart of FIG. 9 describes the data flow during the delete operation. Assume for purposes of illustration that the data flow in the register is (0) (flag) (1) (2) (3). Assume further that the task is to delete (1) (where 1 can be $x$ number of characters) to provide (0) (flag) (2) (3). As shown in FIG. 5 the output from the register as previously described is valid shortly after the fall of $\phi_2$. Thus the flag character in the A register is set in to the N register along the $\overline{D}$ path. The flag is then held in the N register during the subsequent operations until the required number of characters have been deleted. In this case as previously discussed the characters represented by (1) will be deleted. When the (1) character appears at the A register no path is provided for output from the A register as depicted in FIG. 5. Instead while the flag is held in the N register delete codes are inserted into the output register B from the data buss by causing the logical signals BC to be applied. When the required number of characters have been deleted as defined by the control logic, the flag held in the N register is passed by paths $\overline{B}\,\overline{C}$ into the B register and at the same time the character (2) which is in the A register is set along path $\overline{D}$ into the N register and then at the next cycle passes through the N register along path $\overline{B}\,\overline{C}$ into the B register such that the (1) character is effectively deleted. This is illustrated in flow diagram form in FIG. 9. Referring briefly to FIG. 9 when the line, word or character delete key is depressed and a flag code is detected at the output of the shift register the flag is moved to the N register and held and no data path for incoming data is provided thereby deleting the data. Also as above discussed, during the time that the flag is held in the N register the data buss inputs delete codes to the B register along path BC. When an ending code (space, character, carrier return) which indicates that the end of the word, the character or line has been detected in the decode unit, the system then returns to the normal memory cycle.

Figure 10:
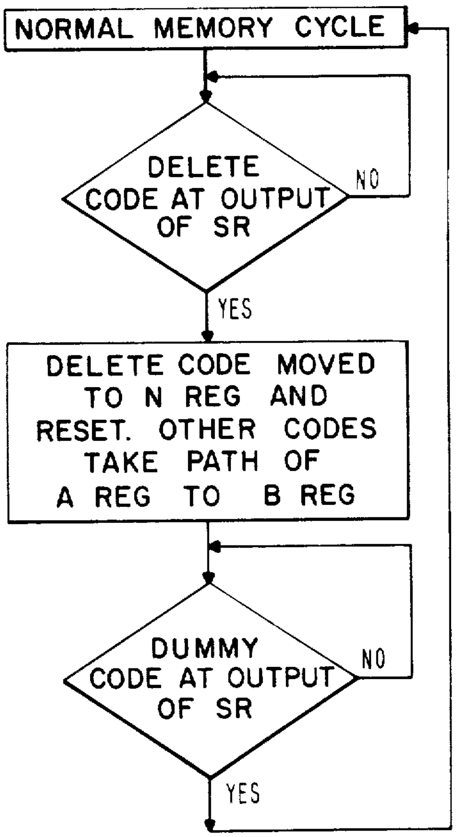
FIG. 10 is a flow diagram illustrating the removal and timewise shifting of delete codes which are inserted in the data flow of FIG. 9 during a delete operation.

In FIG. 10 is shown the flow taken by the system to remove the delete codes which were inserted during the delete operation. Since as above noted delete codes are, for purposes of simplifying the control logic, inserted during the delete operation, they must then be removed. When a delete code is detected at the output of the shift register it is moved to the N register and the other codes follow the path from the A register to the B register. This continues until a dummy code is detected at the output of the shift register and then the normal memory cycle is entered into. As depicted in FIG. 10 only one delete code is worked with during each memory cycle. The overall effect of the flow of FIG. 10 is to move the delete codes back toward the dummy characters which were originally inserted and when they arrive at the dummy position they are then removed and replaced by a dummy character. Thus it takes a number of cycles for the delete codes to be moved back and effectively removed by not providing a path for the delete code from the A register.

Figure 6:
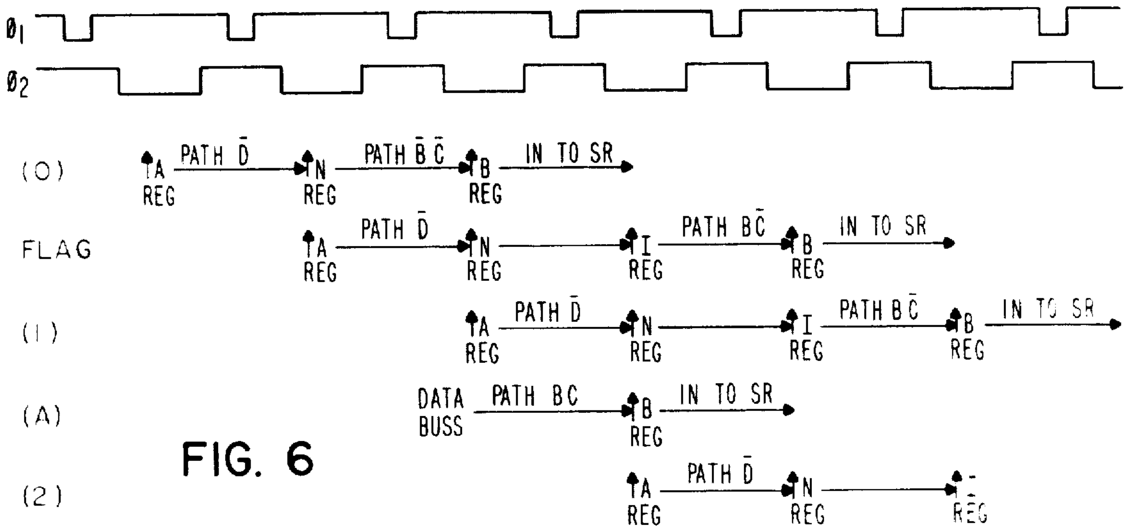
FIG. 6 is a drawing illustrating the timing and data path taken by data in the systems of FIGS. 2 and 4 when a character is to be inserted in the data in the register.
Figure 8:
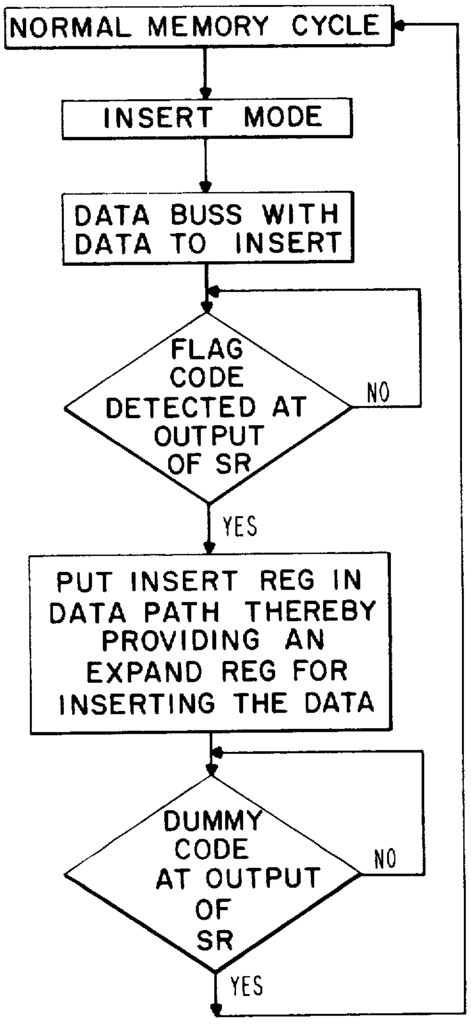
FIG. 8 is a flow chart illustrating the data flow when data is to be inserted as depicted in FIG. 6.

In FIG. 6 is shown a diagram illustrating the insertion of data into the data contained in the shift register while in FIG. 8 is a flow diagram describing this insertion operation. Again for purposes of illustration assume that the data coming out of the output stage of the shift register is (0) (flag) (1), (2), (3), with (0) being the first character. The task for purposes of illustration is to insert an (A) character to provide (0) (A) (flag) (1), (2), (3). As shown in FIG. 6 when the (0) character comes good following the falling edge of $\phi_2$ it is set along path $\overline{D}$ into the N register. At the next falling edge of $\phi_2$, (0) is then applied along path $\overline{B}\,\overline{C}$ into the B register. At the same time the flag which follows the (0) into the A register is set along path $\overline{D}$ into the N register. On the next cycle the (0) is fed into the input stage of the shift register; the flag is moved from the N register into the I register; the (1) which is then in the A register is applied along path $\overline{D}$ into the N register; and the data buss applies the characters to be inserted along path BC into the B register. During the next memory cycle the flag is moved from the I register along the path B $\overline{C}$ into the B register; the (1) is moved from the N register into the I register; the data input from the data buss is moved from the B register into the shift register and the (2) which has been in the A register is applied along the path $\overline{D}$ into the N register. During the next cycle the flag is moved from the B register into the input stage of the shift register; the (1) is moved from I register along paths B $\overline{C}$ into the B register and the (2) is moved from the N register into the I register. Then in the final cycle the (1) is moved from the B register into the shift register thus, effectively inserting the (A) into the data flow. This is illustrated in the flow chart of FIG. 8 wherein it is shown that when the insert mode is entered into and the data buss has data to be inserted, if a flag code is detected, the insert register is put into the data path thereby providing an expand register for inserting the data. The insertion of data then continues until a dummy code is detected at the output of the shift register which indicates that the insert operation is completed and a normal memory cycle is then entered into.

From the above description it can be seen that a very versatile and simple system has been provided for text revision type applications. That and many other conventional editing functions can be performed through simple manipulation of the logical lines A,B,C and D along with the decoding of the required control characters such as delete, dummy, flag, carrier return, space etc. One such function which will briefly be described is that of error correct backspace. Assume that for purposes of illustration the data coming out of the output stage of the shift register is (A) (0) (flag) (1), (2), (3) with (0) being the first character out. Assume further that the task is to backup the flag and remove the 0 so that the data is (A) (flag) (1), (2), (3). This task can be accomplished quite simply as follows. When the (A) is in the N register it is moved along path $\overline{B}\,\overline{C}$ to the B register. At the same time the (0) in the A register is moved along the $\overline{D}$ path to the N register. On the next clock cycle the (A) which is in the B register is then moved into the shift register and the flag which is then in the A register is moved along the $\overline{B}$ C path to the B register. On the next clock cycle the flag which is in the B register then moves into the shift register and the (1) which is then in the A register passes along the $\overline{B}$ C path to the B register and on the next clock cycle it enters into the shift register. Briefly the above flow can be described as follows: when a backspace is detected at the keyboard and a flag code is detected at the output of the shift register, the unwanted character is moved to the N register and held while the flag and other text goes from the A register to the B register. Then when a dummy code is detected at the output of the shift register the normal memory cycle is again entered into.

It will be appreciated by those skilled in the art that there has been provided a novel technique of controlling a shift register which is quite versatile and which in addition is quite simple to implement. This simplicity of control implementation is obtained through use of flag and dummy characters. That is the flag controls the timewise occurrence of the shifting of data from register to register while the dummy codes which were inserted initially determine when the particular operation involved is to end. Thus it will be apparent that both the flag and dummy characters are utilized to affect logical control of the system. It will further be appreciated by those skilled in the art that the heretofore described system is quite versatile insofar as type of applications are concerned in that the inherent speed of the system is dependent upon the clock which drives the shift register and that there is no need for clocking between the data, associated equipment, the shift register, and the control logic since the flag itself is the time controller. Further for the above reasons since the flag, along with the dummy codes are used to accomplish logical control, the length of the register can be expanded or decreased without changing the logical control.

In conclusion there has been provided a shift register and control technique in which no clocking is employed between the control logic, the shift register, and the input to and output from the shift register. Upon start-up of the system, a flag character is loaded at random into the register and the remaining data positions of the register are loaded with dummy bits. Thereafter, the control logic and input to and output from the shift register is timewise controlled by the sensing of the flag which, in the case that the associated input and output means is a typewriter, moves synchronously with the print element or carriage of the typewriter. Four buffers which are connected to the control logic and the data buss for input to and output from the register are connected between its input and output stages and these buffers are logically connected into the data flow upon the sensing of a flag bit to accomplish timewise shifting of the bits in the register for insertion of additional material or deletion of material and other usual functions such as error correct backspace. While the sensing of the flag at the output of the shift register controls the timing of the system, it in conjunction with the sensing of the dummy characters inserted are used to provide a a simplified logical control. That is, the sensing of the flag at the output of the shift register causes the desired sequence to be entered into and this sequence continues until terminated by the sensing of a dummy character at the output of the shift register.

Due to the utilization of the flag to control the instant that a change in the data path is made no clocking between the input/output and control logic is required and additionally, the length of the shift register can be increased or decreased or the timing changed without any change in the control logic. Thus, in the preferred embodiment the only clock employed is the internal register clock.

While the invention has been particularly shown and described with reference to a preferred embodiment, it will be understood by those skilled in the art that various changes in form and detail may be made without departing from the spirit and scope of the invention.

What is claimed is:

1. A system for receiving and storing characters from a data buss and outputting characters to said data buss, and in which no clocking between said data buss and a utilization means connected to said data buss is employed, said system comprising:

cyclical storage means having an input and output stage connected to said data buss, means connecting said data buss to said input stage for storing characters forming a data message in said cyclical storage means, means connecting said data buss to said output stage of said cyclical storage means to output characters to said data buss, and means for timewise shifting previously stored characters in said cyclical storage means in a first direction for insertion of characters in said cyclical storage means by lengthening said data message by one character during each cycle thereof when a character to be inserted appears on said data buss and means for deleting said previously stored characters by one character during each cycle in a second direction in said cyclical storage means to shorten said data message.

2. The system of claim 1 further including a clocking means clocking said cyclical storage means at a frequency such that said cyclical storage means makes at least one complete cycle between the application of characters to said data buss or between the reading of characters from said data buss by said utilization means.

3. The system of claim 2 wherein said means for timewise shifting includes a plurality of single character registers connected between said input and output stages of said cyclical storage means and a logical control unit connected to said plurality of registers operable to cause the data flow in said cyclical storage means to be increased by one character in length by insertion of one of said registers in said data flow each cycle during an insertion operation in the event that a new character to be input appears on said data buss.

4. The system of claim 3 wherein said logical control means is further operable to cause a character which is to be deleted to be deleted during each of said cycles and replaced by a delete code.

5. The system of claim 4 further wherein said delete codes are timewise shifted to the end of said data message.

6. The system of claim 2 further wherein said cyclical storage means is initially loaded with a flag character at a random location in said cyclical storage means and the remaining storage locations in said cyclical storage means loaded with dummy characters and further wherein said flag character is used to control the instant of output of data to said data buss, input of data from said data buss, and timewise shifting of said previously stored characters in said cyclical storage means.

7. The system of claim 6 wherein said means for timewise shifting includes a plurality of registers connected between said input and output stages of said cyclical storage means and a logical control unit connected to said plurality of registers operable to cause the data flow in said cyclical storage means to be increased by one character in length by insertion of one of said registers in said data flow each cycle during an insertion operation in the even that a new character to be input appears on said data buss.

8. The system of claim 7 wherein said logical control unit is further operable during a deletion operation to cause a character which is to be deleted to be deleted during each of said cycles and replaced by a delete code from said data buss.

9. The system of claim 8 further wherein said delete codes are timewise shifted to the end of said data message which said end is defined by said dummy characters stored in said cyclical storage means.

10. The system of claim 9 further wherein said utilization means is a printer having the print element or carriage thereof moving in synchronism with said flag in said cyclical storage means.

* * * * *

PO-1050
(5/69)

UNITED STATES PATENT OFFICE

CERTIFICATE OF CORRECTION

Patent No. 3,675,216 Dated August 8, 1972

Inventor(s) Randell L. James

It is certified that error appears in the above-identified patent and that said Letters Patent are hereby corrected as shown below:

Claim 1, Line 9 insert after "by" -- timewise shifting said previously stored characters by--.

Signed and sealed this 13th day of March 1973.

(SEAL)
Attest:

EDWARD M.FLETCHER,JR.
Attesting Officer

ROBERT GOTTSCHALK
Commissioner of Patents